(12) United States Patent
Loganathan et al.

(10) Patent No.: US 11,366,864 B2
(45) Date of Patent: Jun. 21, 2022

(54) BOT INTEGRATION IN A WEB-BASED SEARCH ENGINE

(71) Applicant: MICROSOFT TECHNOLOGY LICENSING, LLC, Redmond, WA (US)

(72) Inventors: Ashokkumaraar Prabasuthamani Loganathan, Bothell, WA (US); Karthik Sundaramoorthy, Bothell, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 695 days.

(21) Appl. No.: 15/428,889

(22) Filed: Feb. 9, 2017

(65) Prior Publication Data
US 2018/0225381 A1  Aug. 9, 2018

(51) Int. Cl.
*G06F 16/00* (2019.01)
*G06F 16/9535* (2019.01)
(Continued)

(52) U.S. Cl.
CPC ........ *G06F 16/9535* (2019.01); *G06F 16/951* (2019.01); *G06F 3/0481* (2013.01); *G06F 40/30* (2020.01)

(58) Field of Classification Search
CPC .............. G06F 17/2785; G06F 17/279; G06F 17/2881; G06F 16/3329; G06F 16/9024; G06F 16/9535; G06F 17/2705; G06F 16/951; G06F 17/27; G06F 17/278; G06F 16/3344; G06F 3/04842; G06F 8/34; G06F 16/248; G06F 16/3322; G06F 16/334; G06F 16/90332; G06F 17/271; G06F 17/277; G06F 17/28; G06F 3/0482; G06F 16/24522; G06F 16/24575; G06F 16/24578; G06F 16/338; G06F 16/90335; G06F 16/958; G06F 17/218; G06F 17/2247;
(Continued)

(56) References Cited

U.S. PATENT DOCUMENTS 7,069,220 B2  6/2006  Coffman et al.
7,415,537 B1  8/2008  Maes
(Continued)

OTHER PUBLICATIONS

Danny Sullivan, "Google's Impressive "Conversational Search" Goes Live On Chrome", http://searchengineland.com/googles-impressive-conversational-search-goes-live-on-chrome-160445, Published on: May 22, 2013, 14 pages.
(Continued)

*Primary Examiner* — Yicun Wu
(74) *Attorney, Agent, or Firm* — Calfee, Halter & Griswold LLP (57) ABSTRACT

Systems and methods of a search engine for interacting with a computer user as a conversation bot at the direction of the computer user. The search engine provides the computer user with the ability to selectively direct the search engine to interact with the computer user as a conversation bot. In interacting as a conversation bot, upon receive a request from the computer user, the search engine/conversation bot identifies an intent of the request, maps the intent to an action, and carries out the action on behalf of the computer user.

20 Claims, 6 Drawing Sheets

(51) Int. Cl.
*G06F 16/951* (2019.01)
*G06F 3/0481* (2022.01)
*G06F 40/30* (2020.01)

(58) Field of Classification Search
CPC .. G06F 17/274; G06F 17/276; G06F 17/2775;
G06F 3/0481; G06F 9/546; G06F
11/0709; G06F 11/079; G06F 11/0793;
G06F 16/17; G06F 16/22; G06F 16/2428;
G06F 16/243; G06F 16/245; G06F
16/2455; G06F 16/258; G06F 16/3325;
G06F 16/3346; G06F 16/335; G06F
16/358; G06F 16/50; G06F 16/532; G06F
16/9032; G06F 16/9038; G06F 17/24;
G06F 17/2715; G06F 17/272; G06F
17/2765; G06F 17/2795; G06F 17/289;
G06F 3/048; G06F 3/167; G06F 8/10;
G06F 8/20; G06F 8/35; G06F 8/38; G06F
8/60; G06F 9/4413; G06F 9/453
See application file for complete search history.

(56) References Cited

U.S. PATENT DOCUMENTS

| 8,195,683 | B2* | 6/2012 | Bolivar | G06F 17/277 |
| | | | | 707/765 |
| 8,285,652 | B2 | 10/2012 | Biggs et al. | |
| 8,332,393 | B2 | 12/2012 | Elyada | |
| 8,983,964 | B2 | 3/2015 | Megargel et al. | |
| 9,037,594 | B2* | 5/2015 | Joseph | G06F 17/2795 |
| | | | | 707/749 |
| 2015/0066479 | A1 | 3/2015 | Pasupalak et al. | |
| 2015/0356136 | A1 | 12/2015 | Joshi | |

OTHER PUBLICATIONS

Yan Ke, "Let's Have a Conversation", http://blogs.bing.com/search/2014/08/13/lets-have-a-conversation/, Published on: Aug. 13, 2014, 3 pages.

Lee, Nicole, "Chatting with Skype bots feels like talking to a search engine", https://www.engadget.com/2016/03/30/skype-chat-bot-hands-on/, Published on: Mar. 30, 2016, 10 pages.

Haribhakti, Sar, "Apple's unexpected approach to bots", http://venturebeat.com/2016/07/05/apples-unexpected-approach-to-bots/, Published on: Jul. 5, 2016, 10 pages.

"Microsoft Agent", https://msdn.microsoft.com/en-us/library/windows/desktop/ms695784(v=vs.85).aspx, Retrieved on Oct. 14, 2016, 2 pages.

"Chatbots and Conversation as a Platform (CAAP)", https://www.microsoft.com/en-us/research/project/chatbots-conversation-platform-caap/. Published on: Jun. 1, 2014, 4 pages.

"International Search Report and Written Opinion Issued in PCT Application No. PCT/US2018/016533", dated Apr. 25, 2018, 11 Pages.

"Office Action Issued in Indian Patent Application No. 201917032037", dated Jan. 6, 2022, 6 Pages.

* cited by examiner

BOT INTEGRATION IN A WEB-BASED SEARCH ENGINE

BACKGROUND

Web-based search engines are search engines have become a ubiquitous and essential part of online activity. As will be readily appreciated, a web-based search engine, or more simply a search engine, receives search queries from computer users. Generally speaking, upon receipt of a given search query, the search engine determines the intent of the search query, consults one or more data stores to identify online content that is likely relevant and/or likely relates to the determined intent, generates one or more search results pages of search results (snippets of the online content) according to the identified content, and returns at least one search results page to the computer user that submitted the search query.

While search engine technology is now refined to a point that search results are surprisingly relevant and/or related to a given search query, each search query is viewed as a discrete interaction of the requesting computer user with the search engine, and the search results simply point the requesting computer user to the desired content stored "elsewhere."

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, a method, as implemented by a search engine, for responding to a request from a computer user is provided. The method includes providing the computer user with a user interface page for interacting with the search engine, where the user interface page includes a first user control for submitting a search query to the search engine, and further includes a second user control for directing the search engine to interact with the computer user as a conversation bot. An indication of the computer user interaction of the second user control directing the search engine to interact with the computer user as a conversation bot is then received. Thereafter, a request is received from the computer user and an intent of the request is determined. An action is determined that satisfies the determined intent of the request and the determined action is executed on behalf of the computer user.

According to aspects of the disclosed subject matter, a computer-readable medium bearing computer-executable instructions is presented. Upon execution by a processor, the instructions carry out a method as may be implemented by a search engine, for responding to a request from a computer user. The method includes providing the computer user with a user interface page for interacting with the search engine, where the user interface page includes a first user control for submitting a search query to the search engine, and further includes a second user control for directing the search engine to interact with the computer user as a conversation bot. An indication of the computer user interaction of the second user control directing the search engine to interact with the computer user as a conversation bot is then received. Thereafter, a request is received from the computer user and an intent of the request is determined. An action is determined that satisfies the determined intent of the request and the determined action is executed on behalf of the computer user.

According to still further aspects of the disclosed subject matter, a computer system implementing a search engine for responding to search queries and requests from one or more computer users is presented. The system includes a processor and a memory, wherein the processor executes instructions stored in the memory as part of or in conjunction with additional components to respond to search queries and requests from one or more computer users. These additional components include a search results page generator and a conversation bot. The search results page generator is configured (in execution), to respond to a search query with one or more search results pages, where each search results page comprises search results corresponding to content available over a network as determined according to information maintained in a content store. The conversation bot is configured to respond to requests from a computer user, and includes an intent identification component, a conversation manager and an action manager. The intent identification component is configured to identify an intent of the request from the computer user according to a current conversation with the computer user. The conversation manager is configured to determine a current conversation with the computer user. The action manager is configured to determine an action to carry out in response to the request from the computer user according to an identified intent of the request, and to carry out the determined action according to one or more resources stored in a resource list.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

As suggested above, while search engine technology is now refined to a point that search results are surprisingly relevant and/or related to a given search query, each search query is viewed as a discrete interaction of the requesting computer user with the search engine, and the search results simply point the requesting computer user to the desired content stored "elsewhere." The net result is that the search engine doesn't retain and rely upon context of a "conversation" or multiple "conversations" as a source of detail and/or information, especially in regard to providing an answer to a particular query. Further, a search engine does not supply direct answers, but rather provides references to answer to a given query.

An alternative to a search engine is a "conversation bot." By way of definition, a "conversation bot" or, more simply, a "bot" (which is a shorthand name for "web robot") is an automated program that executes on a computing device (or multiple computing devices) and that receives requests from computer users over the Internet, determines the intent of a received request, identifies an appropriate response to the request, and carries out an appropriate response, such as returning information to the requesting computer user. For purposes of clarity and unless specifically identified to the contrary, use of the term "bot" should be viewed as a reference to a "conversation bot."

While there are similarities between a bot and a search engine (e.g., a bot receives a request from a computer user, determines an intent of the request, and supplies the requesting computer user with a response to the request), according to aspects of the disclosed subject matter, there are various distinctions. For example, according to aspects of the disclosed subject matter, a bot maintains a context of a current conversation. According to aspects of the disclosed subject matter, a "conversation" (also referred to as a "session") with a bot corresponds to a series (one or more) of request/response interactions between a computer user and the bot, where the various request/response interactions typically (though not exclusively) occur within some reasonable amount of time of each other as to imply that they are part of an ongoing conversation. Further, a conversation may also be associated with information corresponding to the conversation in the form of data/value tuples. In contrast to operating as a conversation bot, a search engine operating conventionally treats each search query as a distinct, independent request from a computer user.

By maintaining a context of a current conversation, a bot is able to identify and imply various items of information that may or may not be specified in a particular request, but which items of information are germane, and possibly even essential, to providing an appropriate response and/or accurate answers to a request. For example, a computer user may submit a request "Find a hotel for me," to a bot. Without more, the bot would be unable to satisfactorily locate a hotel for the computer user. However, based on interactions of an ongoing conversation with the bot that included a previous request, "What is it like in Tucson in April?", the bot could infer sufficient details from the conversation that the bot could satisfactorily respond by locating hotels in Tucson in the month of April.

While there are some bot services that provide some limited subset of the functionality of the bot described above, these existing bots are focused to a particular topic and are limited to requests regarding that focused topic. In contrast, a search engine is not limited to or focused on a single topic. Rather, a computer user can submit search queries over a variety of topics that are related on a level that is beyond the scope of any given bot. What is needed and set forth as aspects of the disclosed subject matter, is a blending of the broad scope of a search engine with the conversational abilities of a bot.

According to aspects of the disclosed subject matter, a search engine provides a user interface control which, when activated by a computer user, causes the search engine to interact with the computer user as a "master bot," i.e., a bot configured to interact with computer users in receiving requests from a given computer user, determine an intent of the received request, identify a suitable response to the request, and return the identified response to the computer user within the context of a current conversation. In this context, a master bot is one that determines a current intent of a request and, after determining an intent of a received request, identifies one or more resources (e.g., topic specific bots, search results, databases, etc.) to identify a suitable response to a received request.

Figure 1:
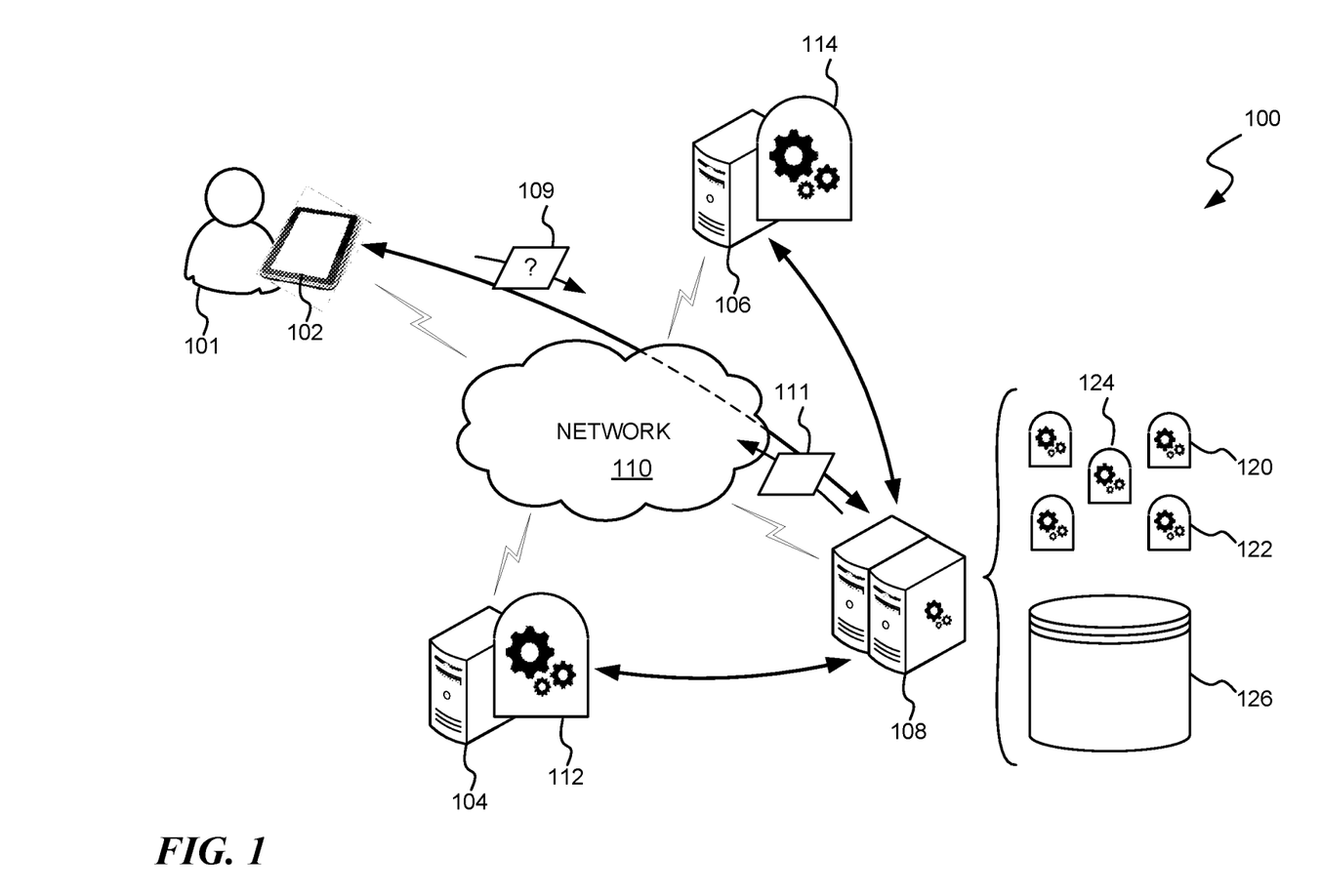
FIG. 1 is a block diagram illustrating an exemplary network environment suitable for implementing aspects of the disclosed subject matter.

Turning now to the figures, FIG. 1 is a block diagram illustrating an exemplary network environment 100 suitable for implementing aspects of the disclosed subject matter. The network environment 100 includes one or more computing devices, such as computing devices 102-108, inter-connected to other computers, services and/or devices over a network 110. As will be appreciated by those skilled in the art, a network is telecommunication framework which allows inter-connected computers, services and/or devices to exchange data. The network 110 may comprise any one or more of a local area network (LAN), a wide area network (WAN), a metropolitan area network (MAN), or combinations of these. The Ethernet, inter-connected computers inter-connected (either via wired or wireless connections) by way of a set of protocols that control the passing of information and avoid simultaneous transmission by two or more computing system, is an example of a suitable network.

In the exemplary network environment 100, a computer user 101 utilizing a user computer 102 submits a request 109 over the network 110 to a to a suitably configured search engine 108. In turn, either as a typical search engine or as a master bot, the search engine determines an appropriate response for the request 109 and responds accordingly. In some instances, the response is in the form of information and/or data, such as information response 111, which is returned to the requesting computer user 101 via the user computer 102. In determining the intent of the request 109 as well as a suitable action to be taken, the search engine 108 may consult with a content store 126 of information or one or more topic-specific bots, such as bots 120-124, which are maintained by the search engine 108. Further, the search engine may consult with, or take action with, one or more external services and/or bots, such as bots 112 and 114.

Figure 2A:
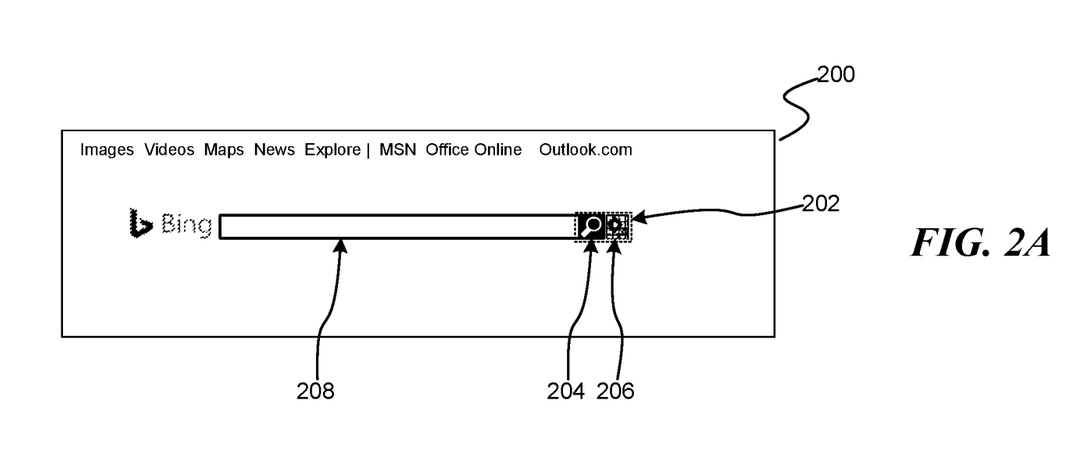
FIGS. 2A and 2B are pictorial diagrams illustrating a portion of an exemplary Web page for interacting with a search engine.
Figure 2B:
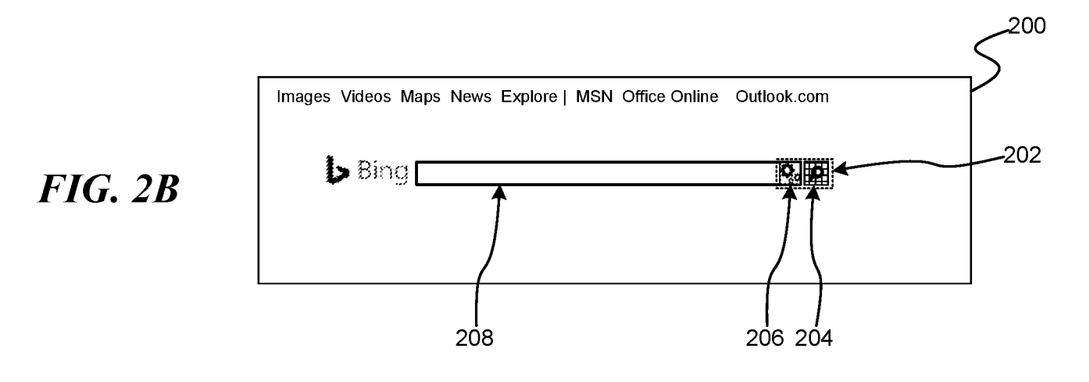

Regarding the user interface control for switching the user interface of a search engine from that of a typical search engine (i.e., receives a search query and responds with one or more search pages of search results) to a master bot, reference is now made to FIGS. 2A and 2B. FIGS. 2A and 2B are pictorial diagrams illustrating a portion of an exemplary Web page 200 for interacting with a search engine. By way of illustration of a first exemplary user interface control, the exemplary Web page 200 includes an input field 208 by which a computer user can input information for submissions to a search engine, such as queries and requests. Also, the exemplary Web page 200 includes a user interface control 202 by which the user can toggle between traditional search engine functionality and conversation bot functionality. In the example of FIG. 2A, the input control 202 is implemented as a type of rocker switch, in which both a typical search engine interaction—as indicated by control feature 204—and a conversation bot interaction—as indicated by control feature 206—are displayed, with the inactive selection displayed as being greyed out, as indicated by the cross-hatching of control feature 206.

By way of illustration, FIG. 2B illustrates the Web page 200 after the user has activated the conversation bot user interface control 206, thereby indicating to the search engine to interact with the user as a conversation bot in the context of a new or an ongoing conversation, as indicated by the search engine interface control 204 being greyed out, as indicated by the cross-hatching of the illustrated control.

Of course, with regard to the user interface controls of FIGS. 2A and 2B, FIGS. 2A and 2B simply illustrate one of many potential user interface controls that may be used to switch between typical search engine interaction (search query, response with search results) and conversation bot interaction (request/response in context of an ongoing conversation.) Those skilled in the art will appreciate that any number of interface mechanisms may be employed to toggle or switch between the search engine interaction modes (e.g., typical search engine interaction vs conversation bot).

Figure 3:
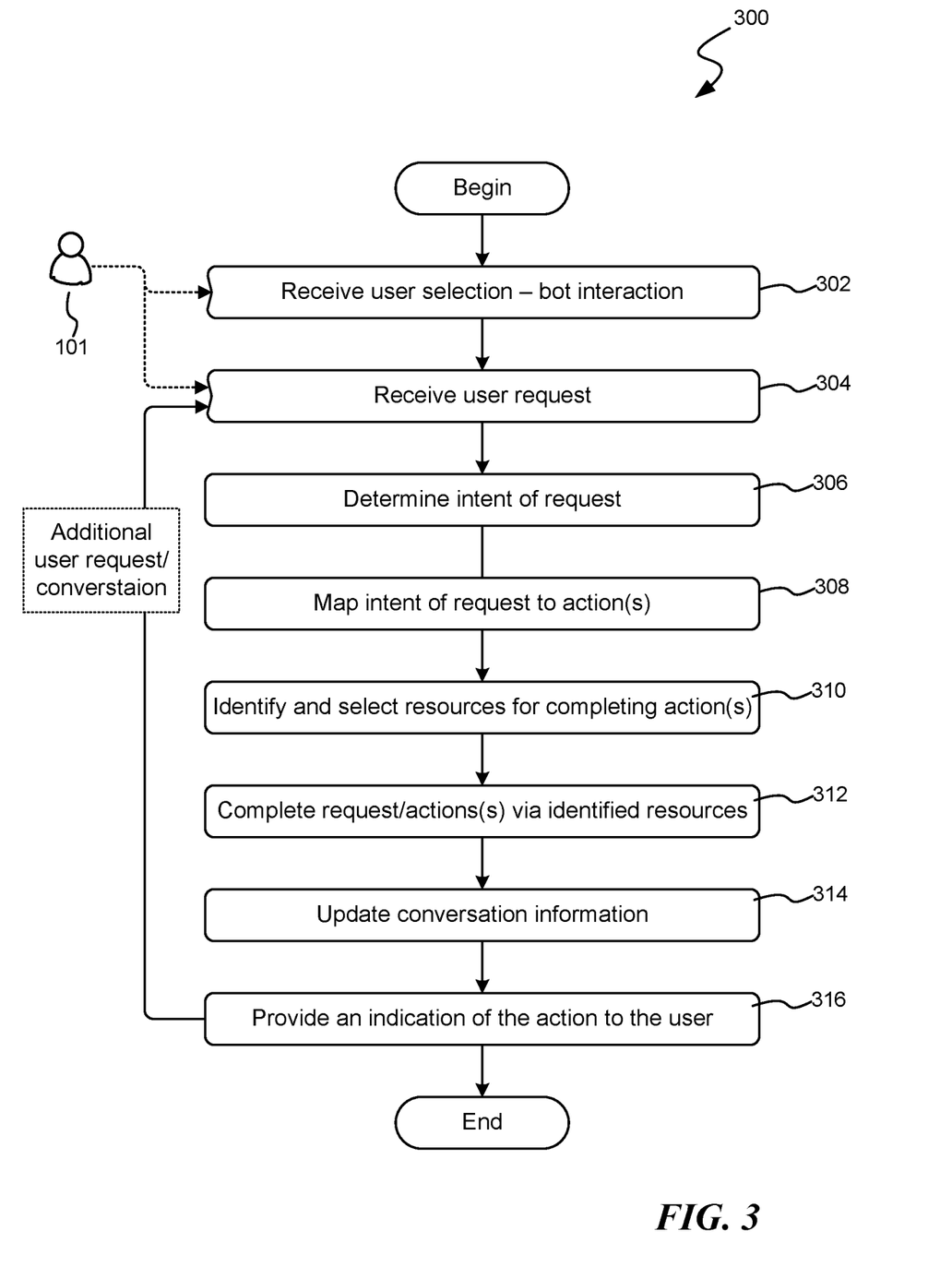
FIG. 3 is a flow diagram illustrating an exemplary routine for interacting with a search engine, suitably configured to operate as a conversation bot.

Turning now to FIG. 3, FIG. 3 is a flow diagram illustration an exemplary routine 300 for interacting with a search engine, suitably configured to operate as a conversation bot. Beginning at block 302, a user section/indication of a desire to interact with the search engine as a conversation bot is received from a computer user 101. At block 304, a user request is received from the computer user.

At block 306, an intent of the received request is determined. According to aspects of the disclosed subject matter, the intent of the received request is determined according to content of the request as well as information that has been identified and/or inferred from other interactions of an ongoing conversation of the computer user with the search engine.

Figure 4:
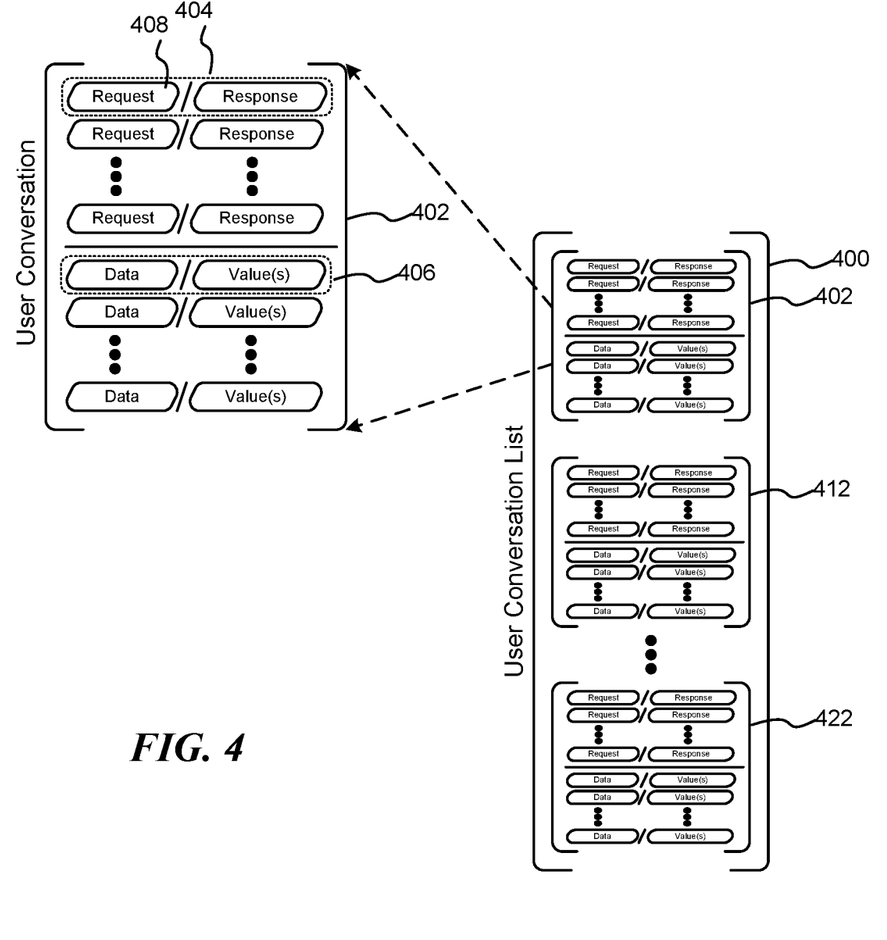
FIG. 4 is a block diagram illustrating an exemplary user conversation and user conversation list as may be maintained by a search engine interacting as a conversation bot.

Regarding the information of an ongoing conversation, as indicated above a conversation with a conversation bot corresponds to a series of request/response interactions between a computer user and the bot, where the various request/response interactions typically (though not exclusively) occur within some reasonable amount of time of each other as to imply that they are part of an ongoing conversation. Turning to FIG. 4, FIG. 4 is a block diagram illustrating an exemplary user conversation 402 and user conversation list 400 as may be maintained by a search engine interacting as a conversation bot. Indeed, interacting as a conversation bot, the search engine, such as search engine 108, maintains a user conversation list for each of a plurality of computer users. Each user conversation list for each computer user comprises one or more user conversation records, such as user conversation record 402. Each user conversation record corresponds to a conversation, as described above, between the computer user 101 and the search engine 108, and comprises one or more request/response pairs (corresponding to request/response interactions) of the conversation.

A current or ongoing conversation record receives the latest request/response interaction as a new request/response record, such as request/response record 404. However, based on a determined intent of a current request/response interaction in view of the intents determined from previous request/response interactions, or a lapse of some period of time since the previous request/response interaction occurred, a new "current" conversation record may be generated for a received request. More particularly, if the intent of the received request appears to be distinct from the intent (or intents) of the current conversation, a new current conversation is generated and the received request becomes part of the new current conversation. Moreover, other factors and aspects may also be utilized to determine whether to create a new conversation record or add the latest request/response interaction to an already existing conversation record, including a lapse in time of interaction with conversation bot.

In addition to the user's request and the search engine's response to the request, a user conversation record may also maintain one or more data/value tuples, such as data/value tuple 406. The data/value tuple includes an indication as to the data type (i.e., the data portion of the tuple), typically though not exclusively conforming to some classification for identifying data types, as well as one or more corresponding data values. By way of illustration and not limitation, a data type may correspond to an "intent" (as in the intent of a user request, such as user request 408), and the intent of the request typically though not exclusively conforming to some classification-specific ontology, such as "schedule/calendar." Alternatively, a data type may correspond to a date and the corresponding value may specify information regarding a date, such as "April 2017."

Returning again to routine 300 of FIG. 3, after determining the intent of the received user request, relying upon explicitly identified information in the request as well as information identified explicitly and implicitly within the current/ongoing conversation, and even obtaining information from previous conversations between the computer user and the search engine, at block 308 the search engine maps the current intent to one or more actions to be carried out by the search engine. These one or more actions may correspond to any number of actions including, by way of illustration and not limitation, obtaining and returning information in regard to an information request, making an appointment on a calendar, creating an alarm or timer, sending a notification to another party, completing a purchase for the computer user, confirming implicit or unspecified information with the user, and the like. In some instances, the action corresponding to a request may be a null action—or no action—such as may be the case when the request from the computer user is informational for the conversation.

At block 310, after determining the one or more actions to be taken in response to the request (or, in some instances, a prior request), the search engine 108 consults an action store to identify online resources suitable for implementing the one or more actions. As indicated above, the search engine may utilize and/or rely upon services of a plurality of bots that it maintains and/or is confederated with, such as conversation bots 120-124, and/or its own search engine service that response to search queries (as described above), as well as external services such as remote conversation bots 112 and 114.

After identifying and selecting the resources for carrying out the actions, which may include ordering the various actions/resources for appropriate processing of the one or more actions, at block 312 the search engine 108 completes the received request via the selected resources. At block 314, the search engine updates the conversation information of the ongoing conversation (as may be recorded in the ongoing conversation record 402 of FIG. 4). At block 316, an indication is provided to the computer user of the action carried out on the user's behalf. Thereafter, if there are additional user requests, the routine 300 returns to block 304 for processing as described above. Alternatively, the routine 300 terminates.

Regarding routine 300 described above, as well as other processes that may be described herein, while these routines/processes are expressed in regard to discrete steps, these steps should be viewed as being logical in nature and may or may not correspond to any specific actual and/or discrete execution steps of a given implementation. Also, the order in which these steps are presented in the various routines and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the routines and/or processes include various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, these routines and/or processes are typically embodied within executable code modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. While computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 5:
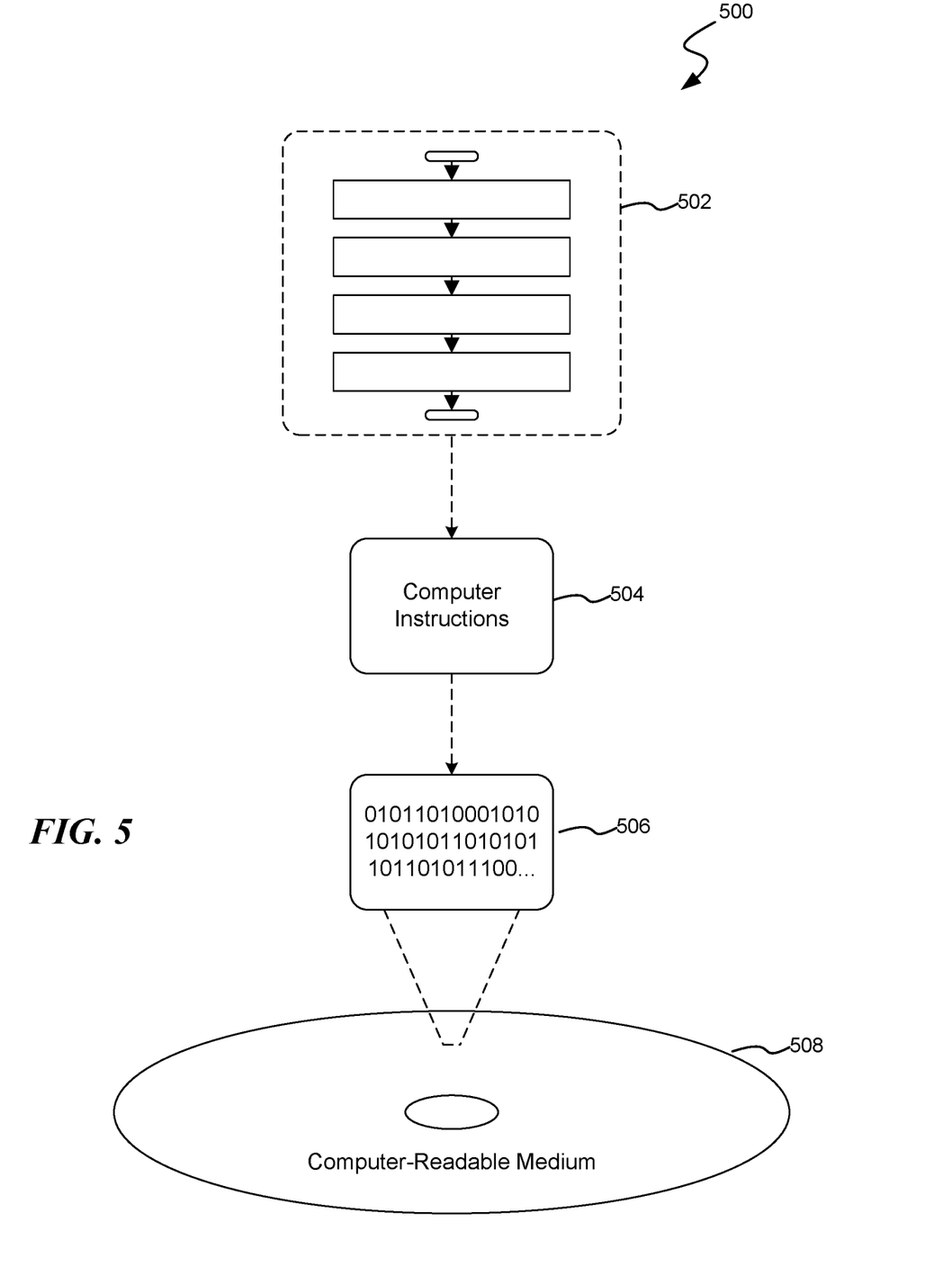
FIG. 5 is a block diagram illustrating an exemplary computer readable medium encoded with instructions to implement a conversation bot according to aspects of the disclosed subject matter.

FIG. 5 is a block diagram illustrating an exemplary computer readable medium encoded with instructions to detect actions within received content and delegating the actions to one or more corresponding action completion bots for execution of the actions, as described above. More particularly, the implementation 500 comprises a computer-readable medium 508 (e.g., a CD-R, DVD-R or a platter of a hard disk drive), on which is encoded computer-readable data 506. This computer-readable data 506 in turn comprises a set of computer instructions 504 configured to operate according to one or more of the principles set forth herein. In one such embodiment 502, the processor-executable instructions 504 may be configured to perform a method, such as at least some of exemplary method 300, for example. In another such embodiment, the processor-executable instructions 504 may be configured to implement a system, such as at least some of the exemplary system 600, as described below. Many such computer readable media may be devised, by those of ordinary skill in the art, which are configured to operate in accordance with the techniques presented herein.

Figure 6:
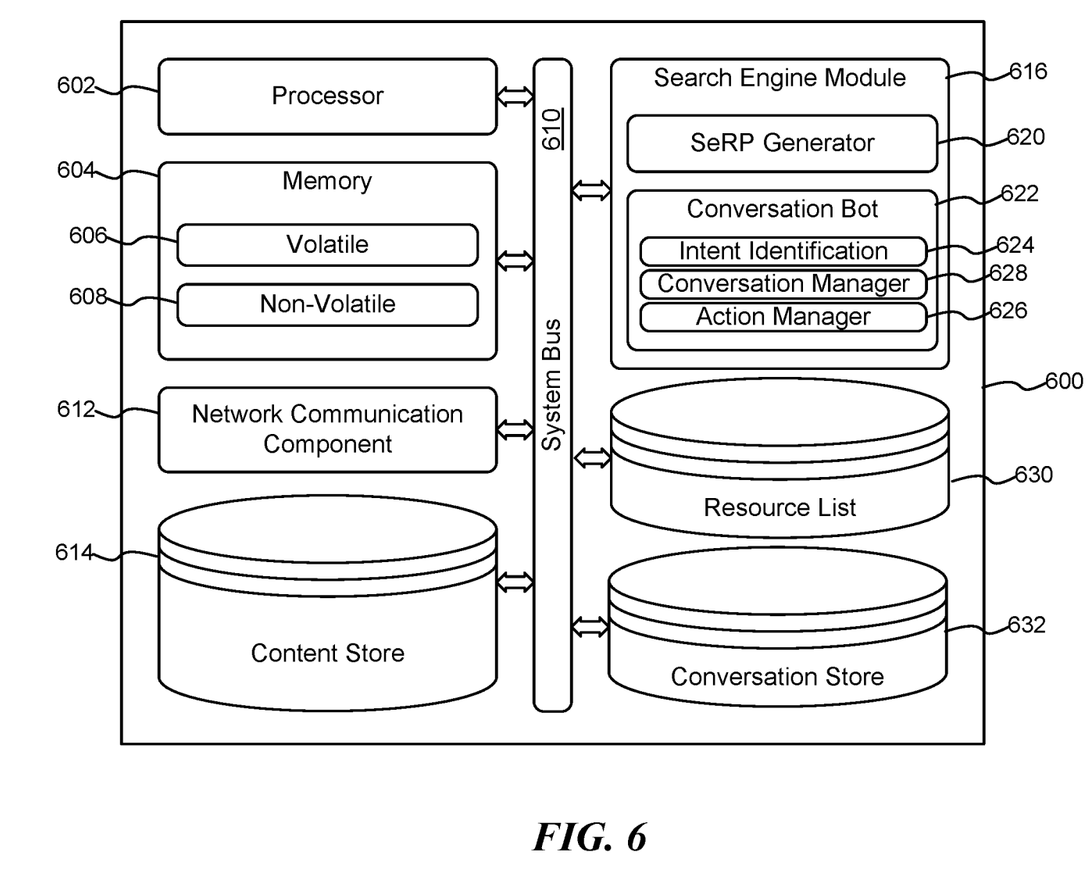
FIG. 6 is a block diagram illustrating an exemplary computing device suitable for implementing aspects of the disclosed subject matter, particularly in regard to providing a search engine configure to interact as a conversation bot.

Turning now to FIG. 6, FIG. 6 is a block diagram illustrating an exemplary computing device 600 suitable for implementing aspects of the disclosed subject matter, particularly in regard to providing a search engine configure to interact as a conversation bot. The exemplary computing device 600 includes one or more processors (or processing units), such as processor 602, and a memory 604. The processor 602 and memory 604, as well as other components, are interconnected by way of a system bus 610. The memory 604 typically (but not always) comprises both volatile memory 606 and non-volatile memory 608. Volatile memory 606 retains or stores information so long as the memory is supplied with power. In contrast, non-volatile memory 608 is capable of storing (or persisting) information even when a power supply is not available. Generally speaking, RAM and CPU cache memory are examples of volatile memory 606 whereas ROM, solid-state memory devices, memory storage devices, and/or memory cards are examples of non-volatile memory 608.

As will be appreciated by those skilled in the art, the processor 602 executes instructions retrieved from the memory 604 (and/or from computer readable media, such as computer readable media 500 of FIG. 5) in carrying out various functions of providing an action delegation agent that identifies and delegates actions to action completion bots based on received content, as set forth above. The processor 602 may be comprised of any of a number of available processors such as single-processor, multi-processor, single-core units, and multi-core units.

Further still, the illustrated computing device 600 includes a network communication component 612 for interconnecting this computing device with other devices and/or services over a computer network, such as network 110 of FIG. 1. The network communication component 612, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 612, is typically comprised of hardware and/or firmware components (and may also include or comprise executable software components) that transmit and receive digital and/or analog signals over a transmission medium (i.e., the network.)

Also illustrated in the exemplary computing device 600 is a computer-executable search engine module 616. When executed on the exemplary computing device 600, the search engine module 616 operates to provide a search engine service, suitably configured as described above. Indeed, the search engine service receives search queries from computer users and, via a SeRP (search results page) generator 620, determines suitable content that satisfies the search query according to information in a content store 614 (typically an indexed content store), generates one or more search result pages and returns the one or more search results pages to the requesting computer user. Additionally and according to aspects of the disclosed subject matter, for those instances in which a computer user has provided an indication to interact with the search engine service as a conversation bot, the search engine module also includes a conversation bot 622.

As described above, the conversation bot 622 receives requests from a computer user in the context of a conversation. The conversation bot 622 maintains one or more conversations (as described above in regard to FIG. 4) for each of one or more computer users in a conversation store 632. As discussed above in regard to routine 300 of FIG. 3, in response to receiving a request from a computer user the conversation bot 622 determines a user intent of the request according to an executable intent identification component 624. The intent identification component, in execution, determines one or more intents of the received request according to the subject matter of the request and information determined (explicitly and/or implicitly) from a current and previous conversation with the user, as well as user preferences in order to determine, with the greatest detail possible, the actual intent of the request. A semantic analysis of a received request may also be typically employed in order to identify the actual intent of the user's request.

In addition to identifying the intent of a given request, the executing conversation bot 622 identifies one or more appropriate actions to be taken in response to the request by way of an action manager 626. The action manager 626, in execution and based on the intent identified by the intent identification component 624 (as well as information associated with the request), identifies one or more appropriate actions to be taken. After determining which action(s) to be taken, the action manager further identifies one or more resources from a resource list 630 to carry out the various actions. As indicated above, these resources may be implemented according to a set of functionality provided by the executing conversation bot 620 and/or the SeRP generator 616, according to one or more related bots, such as bots 120-124 of FIG. 1, external bots accessible over a network 110, such as bots 112-114, local and external services accessible via one or more APIs (application programming interfaces), and the like. Further, in some instances, the one or more actions may include nothing more than saving information in the ongoing conversation.

Regarding the conversations, the conversation bot 622 also includes an executable conversation manager 628. In execution, the conversation manager 628 maintains one or more conversations of a computer user, such as computer user 101 of FIG. 1, in the conversation store 632. According to time (i.e., proximity in time to other requests) and intent (proximity/relatedness of a current request to other requests of a conversation), the conversation manager may add a current request interaction to an existing conversation—as the current/ongoing conversation—or create a new conversation. The conversation manager 628 also stores the information, as data/value tuples discussed in regard to FIG. 4, in the various conversations.

Regarding the various components of the exemplary computing device 600, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary computing device 600 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A method performed by a server computing system that executes a search engine, the method comprising:

receiving, from a client computing device that is in network communication with the server computing system:
   a query set forth by a user of the client computing device; and
   data that indicates that one of a first selectable control or a second selectable control has been selected by the user of the client computing device;
when the data indicates that the first selectable control has been selected by the user of the client computing device:
   identifying search results based upon the query, wherein the search results are identified based further upon the search engine treating the query as a discrete interaction between the user and the search engine; and
   returning the search results to the client computing device for display to the user;
when the data indicates that the second selectable control has been selected by the user of the client computing device:
   identifying a response to the query based upon the query, wherein
   the second response is identified based further upon the search engine treating the query as a portion of a conversation between the user and the search engine; and
   returning the response to the client computing device for display to the user.

2. The method of claim 1, further comprising:
subsequent to returning the response to the client computing device for display to the user, receiving a second query from the user of the client computing device;
identifying a second response based upon both the query and the second query, wherein the second response is identified based further upon the search engine treating the second query as part of the conversation between the user and the search engine; and
returning the second response to the client computing device for display to the user.

3. The method of claim 1, further comprising:
upon the data indicating that the second selectable control has been selected by the user, determining, based upon the query, an intent associated with the query; and
selecting a bot from amongst several bots based upon the intent being associated with the query, wherein the bot selected from amongst the several bots identifies the response.

4. The method of claim 3, wherein the bot is assigned a specific topic.

5. The method of claim 1, further comprising:
prior to receiving the query, receiving a second query from the client computing device, wherein the second query was received at a first time and the query was received at a second time; and
identifying the response based upon the query and the second query being treated as part of the conversation between the user and the search engine, wherein the query and the second query are treated as part of the conversation based upon an amount of time between the first time and the second time.

6. The method of claim 1, further comprising:
upon the data indicating that the second selectable control has been selected by the user, determining, based upon the query, that an intent is associated with the query;
determining that the query belongs to the conversation between the user and the search engine based upon the intent being associated with the query;
subsequent to returning the response to the user, receiving a second query set forth by the user of the client computing device;
determining, based upon the second query, that the intent is associated with the second query;
determining that the second query belongs to the conversation between the user and the search engine based upon the intent being associated with the second query;
identifying a second response to the second query, wherein the second response is based upon the query and the second query, and further wherein both the query and the second query are used to identify the second response due to the query and the second query being determined to belong to the conversation between the user and the search engine; and
returning the second response to the client computing device for display to the user.

7. The computing system of claim 1, the acts further comprising:
upon the data indicating that the second selectable control has been selected by the user, determining, based upon the query, that a first intent is associated with the query;
determining that the query belongs to the conversation between the user and the search engine based upon the first intent being associated with the query;
subsequent to returning the response to the user, receiving a second query set forth by the user of the client computing device;
determining, based upon the second query, that a second intent is associated with the second query;
determining that the second query belongs to a second conversation between the user and the search engine based upon the second intent being associated with the second query;
identifying a second response based upon the second query being determined to belong to the second conversation; and
returning the second response to the client computing device for display to the user.

8. A computer readable medium bearing computer executable instructions which, when executed on a computing system comprising at least a processor, cause the processor to carry out a method for responding to a request from a computer user, the method comprising:
providing a computer user with a user interface page for interacting with a search engine, wherein the user interface page comprises a first user control and a second user control;
receiving an indication that the computer user has selected one of the first user control or the second user control;
receiving a query from the computer user by way of the user interface page;
when the first user control has been selected:
   identifying, by the search engine, search results based upon the query, wherein the search results are further identified by the search engine based upon the search engine treating the query as a discrete interaction with the search engine; and
   returning the search results to the computer user;
when the second user control has been selected:
   identifying, by the search engine, a response to the query based upon the query, wherein the response is further identified by the search engine based upon the search engine treating the query as a part of a conversation between the computer user and the search engine; and returning the response to the computer user.

9. The computer readable medium of claim 8, wherein the response is identified based further upon another query identified as belonging to the conversation.

10. The computer readable medium of claim 8, wherein the response is identified by a topic-specific conversation bot, where the topic-specific conversation bot and the query have a topic assigned thereto.

11. A computing system comprising:
a processor; and
memory storing instructions that, when executed by the processor, cause the processor to perform acts comprising:
receiving, from a client computing device that is in network communication with the server computing system:
a query set forth by a user of the client computing device; and
data that indicates that one of a first selectable control or a second selectable control has been selected by the user of the client computing device;
upon the data indicating that the first selectable control has been selected by the user of the client computing device:
identifying search results based upon the query, wherein the search results are identified based further upon the search engine treating the query as a discrete interaction between the user and the search engine; and
returning the search results to the client computing device for display to the user;
upon the data indicating that the second selectable control has been selected by the user of the client computing device:
identifying a response to the query based upon the query, wherein the response is identified based further upon the search engine treating the query as a portion of a conversation between the user and the search engine; and
returning the response to the client computing device for display to the user.

12. The computing system of claim 11, the acts further comprising:
subsequent to returning the response to the client computing device for display to the user, receiving a second query from the user of the client computing device;
identifying a second response based upon both the query and the second query, wherein the second response is identified based further upon the search engine treating the second query as part of the conversation between the user and the search engine; and
returning the second response to the client computing device for display to the user.

13. The computing system of claim 11, the acts further comprising:
upon the data indicating that the second selectable control has been selected by the user, determining, based upon the query, an intent associated with the query; and
selecting a bot from amongst several bots based upon the intent associated with the query, wherein the bot selected from amongst the several bots identifies the response.

14. The computing system of claim 13, wherein the bot is assigned a specific topic.

15. The computing system of claim 11, the acts further comprising:
prior to receiving the query, receiving a second query from the client computing device, wherein the second query was received at a first time and the query was received at a second time subsequent the first time; and
identifying the response based upon the query and the second query being treated as part of the conversation between the user and the search engine, wherein the query and the second query are treated as part of the conversation based upon an amount of time between the first time and the second time.

16. The computing system of claim 11, the acts further comprising:
upon the data indicating that the second selectable control has been selected by the user, determining, based upon the query, that an intent is associated with the query;
determining that the query belongs to the conversation between the user and the search engine based upon the intent being associated with the query;
subsequent to returning the response to the user, receiving a second query set forth by the user of the client computing device;
determining, based upon the second query, that the intent is associated with the second query;
determining that the second query belongs to the conversation between the user and the search engine based upon the intent being associated with the second query;
identifying a second response to the second query, wherein the second response is identified based upon the query and the second query, and further wherein both the query and the second query are used to identify the second response due to the query and the second query being determined to belong to the conversation between the user and the search engine; and
returning the second response to the client computing device for display to the user.

17. The computing system of claim 11, the acts further comprising:
upon the data indicating that the second selectable control has been selected by the user, determining, based upon the query, that a first intent is associated with the query;
determining that the query belongs to the conversation between the user and the search engine based upon the first intent being associated with the query;
subsequent to returning the second search results to the user, receiving a second query set forth by the user of the client computing device;
determining, based upon the second query, that a second intent is associated with the second query;
determining that the second query belongs to a second conversation between the user and the search engine based upon the second intent being associated with the second query;
identifying a second response based upon the second query being determined to belong to the second conversation; and
returning the second response to the client computing device for display to the user.

18. The computing system of claim 11, wherein the response is identified based upon a second response returned by the search engine to the client computing device in response to receipt of a second query, wherein the second query was received by the search engine prior to the query.

19. The computing system of claim 11, the acts further comprising:
    upon the data indicating that the second selectable control has been selected by the user of the client computing device, determining a topic that corresponds to the query; and
    selecting a topic-specific bot from amongst several topic-specific bots based upon the topic, wherein the topic-specific bot provides the response.

20. The computing system of claim 11, wherein the first user-selectable control and the second user-selectable control correspond to a first position of a toggle switch and a second position of the toggle switch.

* * * * *